United States Patent

Boutaghou et al.

[11] Patent Number: 5,757,101
[45] Date of Patent: May 26, 1998

[54] LAMINATED BACK IRON STRUCTRUE FOR INCREASED MOTOR EFFICIENCY

[75] Inventors: Zine-Eddine Boutaghou, Owatonna; Richard W. Luoma, Rochester, both of Minn.

[73] Assignee: International Business Machines Corporation, Armonk, N.Y.

[21] Appl. No.: 689,477

[22] Filed: Aug. 8, 1996

Related U.S. Application Data

[62] Division of Ser. No. 467,109, Jun. 6, 1995.

[51] Int. Cl.$^6$ .................................................. H02K 1/22
[52] U.S. Cl. .................... 310/261; 310/67 R; 310/68 R; 360/99.08
[58] Field of Search .................... 310/67 R, 68 R, 310/261; 360/99.08

[56] References Cited

U.S. PATENT DOCUMENTS

| | | | |
|---|---|---|---|
| 3,790,834 | 2/1974 | Tanaka | 310/162 |
| 4,361,776 | 11/1982 | Hayashi et al. | 310/268 |
| 4,651,066 | 3/1987 | Gritter et al. | 318/139 |
| 4,694,210 | 9/1987 | Elliott et al. | 310/68 R |
| 4,712,035 | 12/1987 | Forbes et al. | 310/269 |
| 4,763,053 | 8/1988 | Rabe | 318/254 |
| 4,839,552 | 6/1989 | Takaba | 310/268 |
| 4,841,393 | 6/1989 | MacLeod et al. | 360/98.07 |
| 4,882,643 | 11/1989 | Shirotori | 360/99.08 |
| 4,883,982 | 11/1989 | Forbes et al. | 310/62 |
| 4,949,000 | 8/1990 | Petersen | 310/179 |
| 5,015,893 | 5/1991 | Shiozawa | 310/67 R |
| 5,041,749 | 8/1991 | Gaser et al. | 310/156 |
| 5,148,070 | 9/1992 | Frye et al. | 310/168 |
| 5,247,410 | 9/1993 | Ebihara et al. | 360/106 |
| 5,305,163 | 4/1994 | Holm | 360/98.01 |
| 5,396,757 | 3/1995 | Kobayashi et al. | 57/100 |

FOREIGN PATENT DOCUMENTS

| | | | |
|---|---|---|---|
| 61-30927 | 2/1986 | Japan | H02K 1/12 |
| 62-245570 | 10/1987 | Japan | G11B 19/20 |
| 63-129851 | 2/1988 | Japan | 310/68 R |

*Primary Examiner*—Steven L. Stephan
*Assistant Examiner*—Elvin G. Enad
*Attorney, Agent, or Firm*—Richard E. Billion; Owen J. Gamon

[57] ABSTRACT

A rigid disk drive spindle motor includes a bobbin carried by the motor hub which has a permanent magnet attached to the inner cylindrical surface and a laminated back iron mounted at the outer cylindrical surface. The laminated back iron may be in the form of concentric cylinders or a spiral wound strip with adjoining cylinders or convolutions secured to and electrically separated from one another by an adhesive material. In another form, the back iron may be formed as a series of washer like rings mounted on the bobbin which is a configuration similar to the laminations used in the motor stator and would permit fabrication using the same manufacturing techniques. The back iron is formed of high resistance silicon steel so that both the back iron material and the laminated structure discourage Eddy current formation. The spiral wound embodiment may also be modified by having the spiral strip periodically, axially interrupted to further reduce undesired induced currents. Use of the bobbin serves to assure the concentricity of the closely adjoining stationary and rotary parts of the spindle motor and to facilitate easier manufacture and assembly. To further confine the magnetic fields, laminated fringe ring assemblies are provided at each axial end of the back iron structure. These assemblies are formed of washer like rings of permeable material that are secured to one another and electrically separated by adhesive material.

8 Claims, 4 Drawing Sheets

LAMINATED BACK IRON STRUCTRUE FOR INCREASED MOTOR EFFICIENCY

This is a divisional of co-pending application Ser. No. 08/467,109 filed on Jun. 6, 1995.

FIELD OF THE INVENTION

This invention pertains to rigid disk data storage devices and more particularly to an improved spindle motor structure which achieves enhanced motor efficiency at higher rotational velocities.

BACKGROUND OF THE INVENTION

Virtually all data storage disk drive devices of current design are in confined environments requiring minimal energy consumption. Limiting energy use is required to reduce the heat that must be dissipated and to preclude impairment of the life of the device components as well as enhance economy. Further, in the compact enclosed volume of a magnetic disk drive, the design must assure that the four strong magnetic fields associated with the actuator voice coil motor and spindle motor do not compromise the minute magnetic domains and weak data signals of the data handling and storage functions. With track densities of at least 4400 tracks per inch and linear densities in excess of 133 thousand bits per inch, an areal recording density of 600 million bits of storage in each square inch is being used. Compared to these small magnetic data storage domains, the actuator and spindle motors each contain strong permanent magnets and generate significant fields about the cooperating pulsed voice coil and commutated windings. While magnetic storage domains become smaller, the need is for greater actuator access speeds and lower response times and currently the trend is to increase spindle rotational velocities.

With increased rotational velocities of the disk-spindle assembly, the power dissipated by the spindle motor increases while the efficiency of the motor decreases due to heating and the increased magnitude of the Eddy currents present in the back iron. It is desirable to increase the efficiency of the motor to handle increased speeds and to limit the run current of the spindle motor. One way is to increase the torque constant, however, back emf constraints limit the permitted torque constant.

The motor input electrical power is given by the following generalized equation:

$$P = \frac{\frac{\pi}{2} \times \bar{\omega} D^2 L Q B}{\eta}$$

where

P=input power
η=efficiency of motor
ω=rotational speed of the motor
Q=specific electrical loading
B=specific magnetic loading
D=armature diameter
L=armature length Traditionally, to limit the run current it was desirable to choose a magnet with a large B to enable the electrical loading to be small. This practice was acceptable for lower rotational speeds. However, with increased rotational speeds, in excess of 10,000 rpm, little can be done to increase the magnetic field to achieve low run current, since rare earth magnets are used which have very high specific magnetic loading (B). The motor ability to transform efficiently the electrical power to mechanical power must be increased. Typical motor efficiency is around 70% and the efficiency will decrease with increased rotational speeds.

SUMMARY OF THE INVENTION

Motor stators are made with a high resistance steel (silicon steel) and separated by an insulating material to reduce Eddy current formation due to changes in magnetic fields. In disk drives using increased rotational velocities, the eddy currents are expected to increase due to increases in magnetic and electrical fields necessary to produce the desired torques.

The present invention increases the efficiency of the spindle motor by reducing the Eddy current losses in the back iron of the motor. Traditionally the back iron is a solid ring allowing the formation of Eddy currents. By replacing the solid ring by a multitude of insulated concentric rings or a spiral (wound), the amplitude of Eddy currents forming will be decreased substantially; thus significantly increasing the efficiency of the motor. The spiral wound back iron can be further enhanced by forming the spiral of as sequence of shorter strips to form an interrupted wound back iron. Unlike the solid back iron solution which uses a low carbon (Pb filled) for ease of machining, the wound back iron can be formed with high resistance steel (containing silicon) reducing the formation of Eddy currents even further. The back iron wound structures will also reduce the hysteresis losses generally associated with one piece back irons by proper selection of the back iron material.

During winding of the back iron an insulating adhesive is disposed between the layers to reduce cross coupling to a minimum. The adhesive is also useful to reduce any possible vibrations. To maintain dimensional integrity and stability, the back iron is mounted about or wound on a bobbin cylindrical portion and confined between flanges while the permanent magnet is secured to he reverse side of the bobbin cylindrical portion. To further confine the fields within the spindle motor, the laminated back iron is supplemented by laminated fringe rings at each axial end to reduce and confine the associated fringe fields.

DETAILED DESCRIPTION

Figure 1:
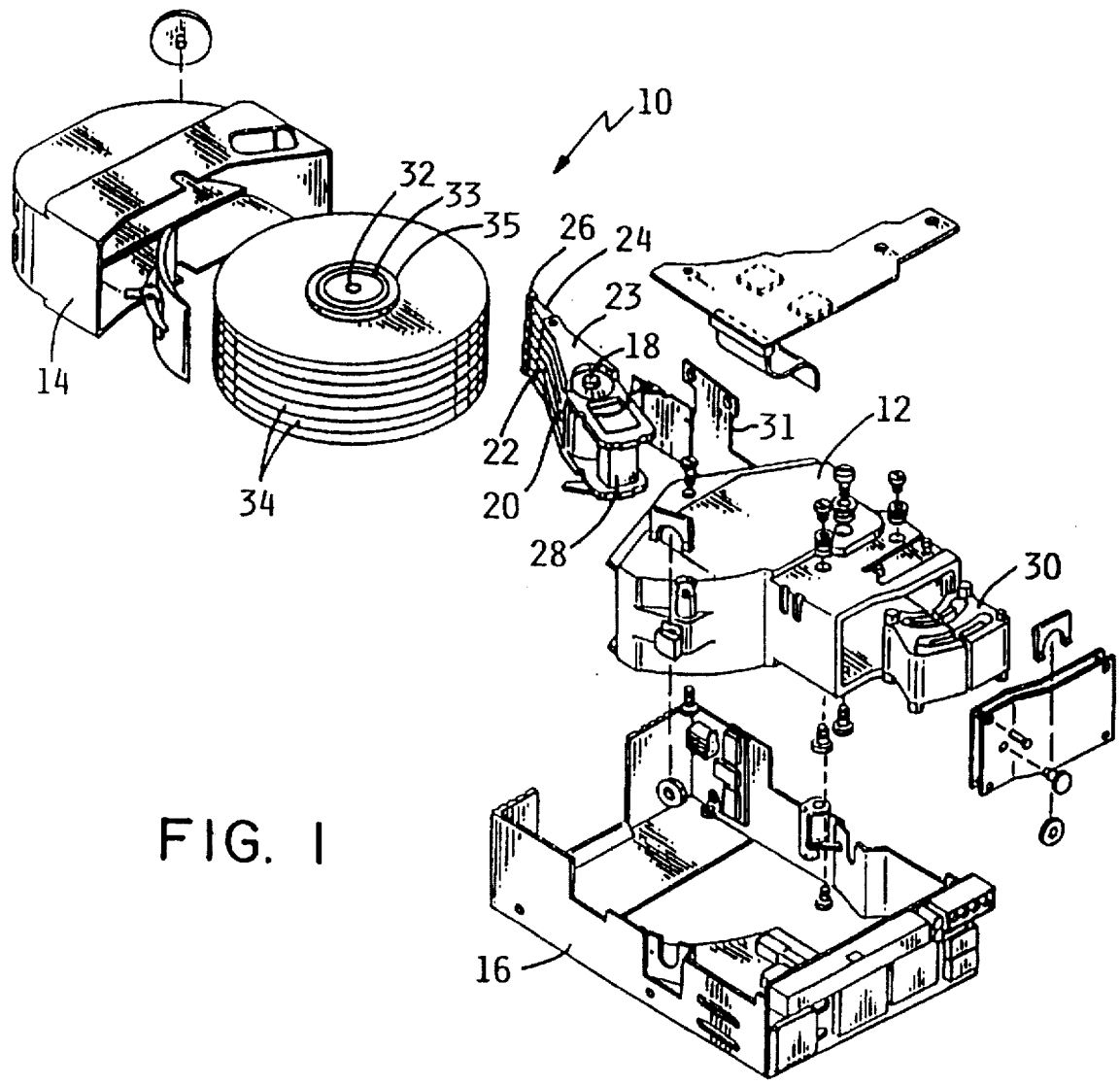
FIG. 1 is an exploded view of a typical disk drive including a spindle motor concentrically within the disk stack assembly.

FIG. 1 is an exploded view of a typical hard disk data storage device 10 wherein the performance can be enhanced using the structure of the present invention. The disk drive 10 includes a housing 12 and a housing cover 14 which, after assembly, is mounted within a frame 16. Rotatably attached within housing 12 on an actuator shaft 18 is an actuator arm assembly 20. One end of the actuator arm assembly 20 includes an E block or comb like structure 22 having a plurality of arms 23. Attached to the separate arms 23 on the comb or E block 22 are load springs 24. Attached at the end of each load spring is a slider 26 which carries a magnetic transducer(not visible). On the other end of the actuator arm assembly 20 opposite the load springs 24 and the sliders 26 is a voice coil 28. Mounted within the housing 12 are a pair of magnet assemblies 30. The pair of magnet assemblies 30 and the voice coil 28 are key parts of a voice coil motor which applies a force to the actuator assembly 20 to cause rotation about the actuator shaft 18. Rotatably attached to the spindle shaft 32 is a hub 33 on which the disks 34 are supported in axially spaced relation and retained by a heat shrink clamp 35. Also shown is a flex cable 31 which carries electrical signals to and from the actuator arm assembly 20.

Figure 2:
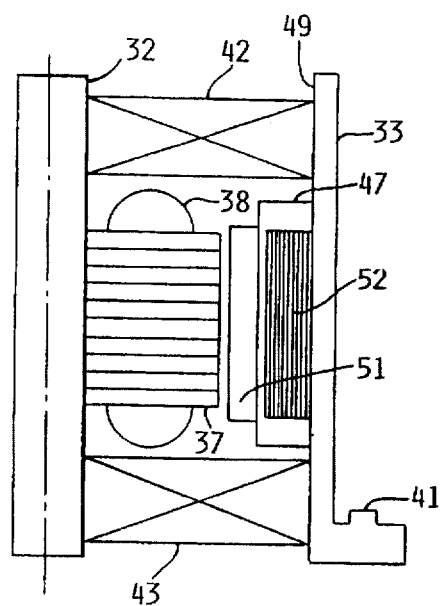
FIG. 2 is a partial section view of a disk drive spindle motor incorporating the present invention.

The disk spindle assembly, as partially shown in FIG. 2, includes a stationary center post or spindle shaft 32 on which are supported core laminations 37 and stator windings 38. Surrounding centerpost 32 is a hub 33 which is a portion of the spindle motor rotor and also supports the data disks that surround the hub 33. The data disks and intervening spacers are retained and supported between the shoulder 41 and a heat shrink clamp ring (clamp 35, FIG. 1) that maintains a shrink fit about an upper part of the hub. The hub is rotatably supported on the shaft by a pair of bearings 42, 43. A bobbin 47 is concentric with and secured to the inner cylindrical surface 49 of the hub 33 and supports both the permanent magnet 51 at one radial side of the bobbin cylindrical portion and a laminated back iron 52 at the opposite radial side of the bobbin cylindrical portion. The bobbin flanges confine the laminated back iron.

Figure 3:
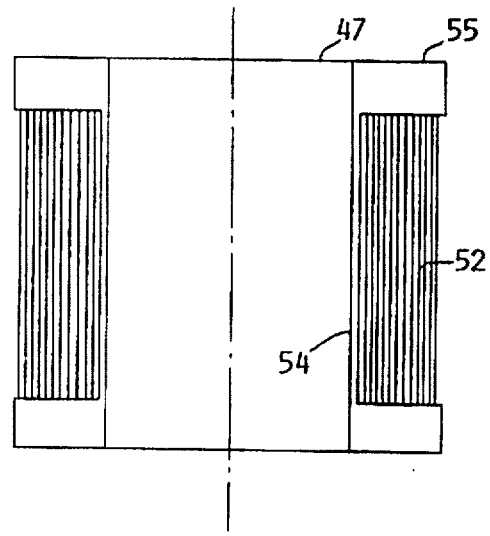
FIG. 3 shows the bobbin and laminated back iron assembly of FIG. 2 in section.
Figure 6A:
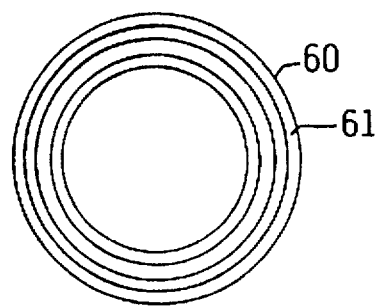
FIG. 6A schematically illustrates a back iron formed of concentric cylinders of high resistance steel.
Figure 6B:
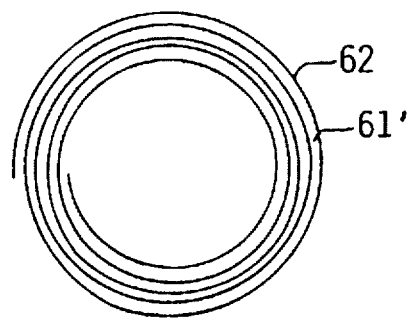
FIG. 6B schematically illustrates a wound or spiral back iron configuration.
Figure 6C:
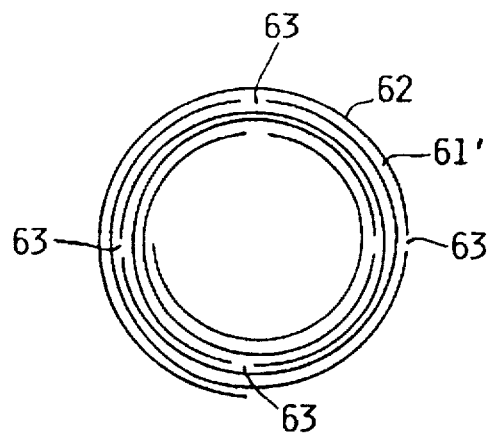
FIG. 6C is similar to the wound lamination embodiment of FIG. 6B, but with the wound laminate strip being periodically interrupted to further suppress induced currents.

FIG. 3 shows the bobbin of the embodiment shown in FIG. 2 with a central cylindrical portion 54 and flanged axial end portions 55. The bobbin 47 serves to achieve dimensional stability and maintain concentricity between the stationary stator laminations and the rotating permanent magnet. FIGS. 6A through 6C, in a very schematic manner, show the configurations that may be used for the laminated back iron supported on the bobbin. FIG. 6A shows a series of concentric circular cylinders 60 of high resistance, permeable material that are laminated and electrically isolated by adhesive material 61. FIG. 6B is a back iron formed of a spiral wound strip 62 of high resistance, permeable material which is coated with adhesive 61 to separate and electrically isolate adjacent convolutions, of the strip material forming the spiral, from one another. This is the configuration that can most readily be fabricated. FIG. 6C shows a modification of the spiral configuration of FIG. 6B wherein the strip material is periodically interrupted at varying circumferential locations 63 to further resist undesired Eddy currents. The adhesive 61' both secures the adjoining convolutions of the back iron laminations together and also electrically insulates adjoining convolutions and consecutive strip portions.

Figure 4:
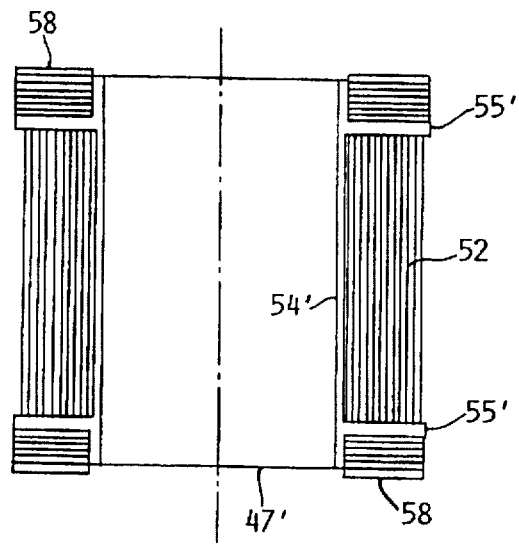
FIG. 4 is a section view of the bobbin with the laminated back iron and the fringing rings at the axial ends of the back iron.

FIG. 4 shows a bobbin 47' which has a bobbin cylindrical portion 54' and end flanges 55' with the laminated back iron 52 secured along the outer periphery of the bobbin cylindrical portion 54'. Supported at each axial end of bobbin 47' is a ring assembly 58 formed of annular washer shaped laminations secured to one another and electrically isolated by an adhesive. This laminated ring structure 58 serves to minimize fringe fields associated with the ends of the permanent magnet and confine the stray fields to the motor location. All of the back iron laminations and fringe rings are formed of high resistance silicon steel to reduce unwanted induced currents.

Figure 5:
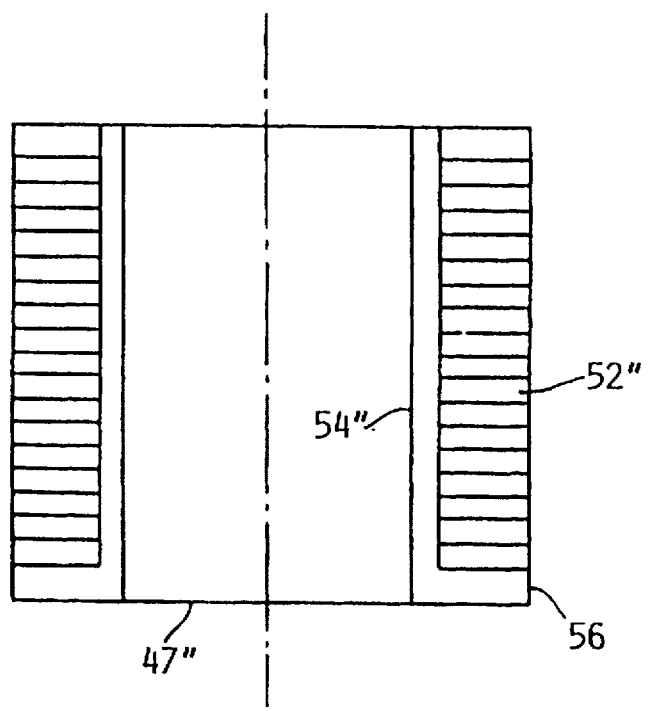
FIG. 5 shows a bobbin with a laminated back iron formed as a series of axially aligned rings.

FIG. 5 is similar to FIGS. 3 and 4 showing a bobbin 47" and a back iron 52". The bobbin 47" has a cylindrical portion 54" and a single flange 56 at one axial end. The back iron 52" is formed of a series of axially aligned washer like rings which are secured to one another by an adhesive that also serves to electrically isolate adjoining rings from each other. This laminated back iron structure is similar to the laminations of the motor stator in the motor of FIG. 2). A favorable attribute of this laminate structure is the ease of manufacture.

While the invention has been particularly shown and described with reference to preferred embodiments, it will be understood by those skilled in the art that various changes in form and details may be made therein without departing from the spirit and scope of the invention.

What is claimed is:

1. An electric motor including a stator with a laminated core and commutated windings, a rotor assembly, and bearing means supporting said rotor for rotation relative to said stator comprising:

a bobbin forming a pair of said rotor assembly and having a central cylindrical portion comprising an inside and an outside;

a permanent magnet secured on the inside of said bobbin central cylindrical portion facing the stator; and a laminated back iron mounted on the outside of said bobbin central cylindrical portion.

2. The electric motor of claim 1 wherein said laminated back iron comprises a spiral wound strip of material having a high electrical resistance, wherein said spiral wound strip comprises a plurality of adjoining convolutions being electrically insulated from one another.

3. The electric motor of claim 2 wherein said laminated back iron is formed of a strip of silicon steel and said adjoining convolutions are separated by an adhesive material.

4. The electric motor of claim 3 further comprising at least one fringe ring assembly comprising a series of washer like, electrically isolated rings aligned at the axial end of said bobbin.

5. The electric motor of claim 1 wherein said laminated back iron comprises a series of concentric cylinders of high electrical resistance material with adjoining cylinders being secured to and electrically isolated from one another.

6. The electric motor of claim 5 wherein said cylinders forming said laminated back iron are separated from one another by an adhesive material.

7. The electric motor of claim 5 further comprising a pair of fringe ring assemblies respectively aligned at each axial end of said bobbin with each of said fringe ring assemblies comprising a series of washer like, electrically isolated rings.

8. The electric motor of claim 1 wherein said laminated back iron comprises a series of axially aligned, washer like rings, wherein each ring in the series is secured to and electrically isolated from an adjacent ring in the series by an adhesive material.

* * * * *